Sept. 15, 1942.  S. M. PELC  2,296,116
LAMINATED PISTON RING
Filed May 19, 1941

Stanley M. Pelc
INVENTOR

BY Victor J. Evans & Co.
ATTORNEYS

Patented Sept. 15, 1942

2,296,116

UNITED STATES PATENT OFFICE 2,296,116

LAMINATED PISTON RING

Stanley M. Pelc, Greenville, Pa.

Application May 19, 1941, Serial No. 394,205

3 Claims. (Cl. 309—22)

My invention relates to improvements in pistons.

An object of the invention is to provide a piston construction in which a series of specifically constructed and arranged piston rings are so placed as to prevent the leakage of oil or the compression from the engine around the same, and, at the same time, prevent any undue wear on the walls of the cylinder.

Another object of the invention is to provide a piston of the character described, in which the lubricating oil and compression from the end of the cylinder will have a long circuitous passage around the inner edges of the rings before reaching the crank case, whereby leakage thereof is reduced to a minimum.

A further object of the invention is to provide a piston construction, in which there is a minimum amount of wear on the wall of the cylinder; and, at the same time, reduces the wear on the side walls of the rings.

A still further object of the invention is to provide a simple and effective piston and ring construction which can be cheaply manufactured and readily assembled.

Figure 1:
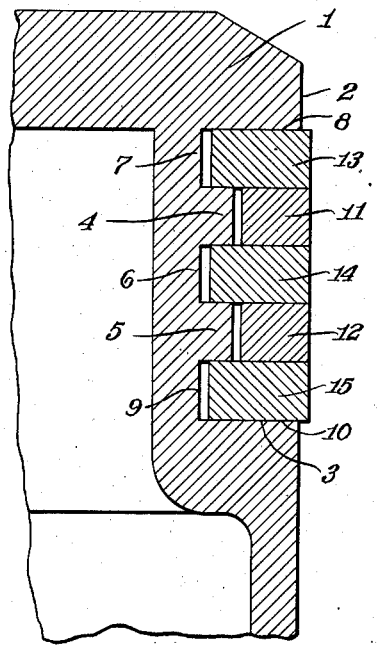
Fig. 1 is a vertical sectional view of a piston, partly broken away, showing my invention.

Referring now to the drawing, 1 represents a piston of the ordinary construction and having arranged in its side walls 2 a broad ring channel 3. The lower or inner face of the channel is provided with two circumferential outwardly extending rectangular flanges 4 and 5, leaving a space 6 between the same and also a space 7 between the end 8 of the channel. A space 9 is also left between the flange 5 and the end wall 10 of the channel 3.

Within the channel, and opposite the circumferential flanges 4 and 5, are arranged the two shallow rings 11 and 12. Between the ring 11 and the end 8 of the channel is arranged the ring 13, which is of a greater depth than the ring 11. Arranged between the shallow rings 11 and 12 is a ring 14, and between the ring 12 and the wall 10 of the channel is a ring 15 of the same size as the ring 13. By the arrangement shown in Figure 1 of the drawing, it will be seen that the outer faces of all the rings are in the same plane, leaving a space at the inner periphery of each ring.

Figure 2:
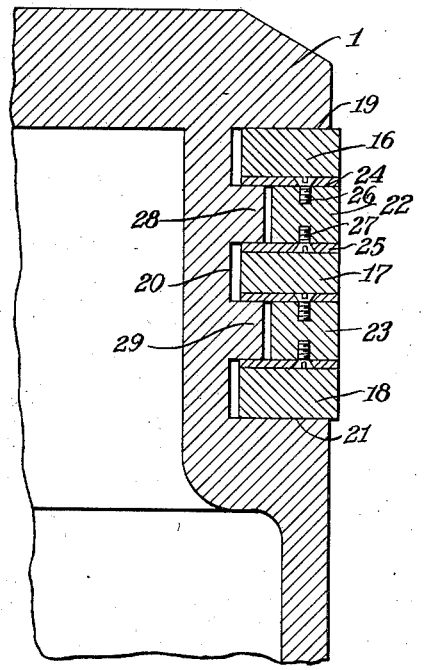
Fig. 2 is a vertical sectional view, similar to Fig. 1, showing a modified form of my invention.
Figure 4:
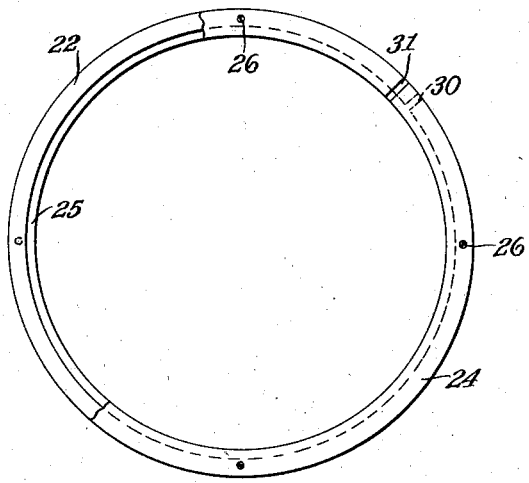
Fig. 4 is a top edge view, partly broken away, of the ring shown in Fig. 3.
Figure 3:
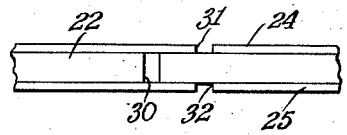
Fig. 3 is a side elevation of one of my improved rings.

In the modification shown in Figure 2 of the drawing, the rings 16, 17 and 18 are of a width less than the spaces 19, 20 and 21 in the wall of the channel. The rings 22 and 23 are provided on each side with plates 24 and 25 made of hard steel and secured in place by screws 26 and 27. These plates are of a depth greater than that of the ring and straddle the circumferentially arranged rectangular projections 28 and 29 carried by the inner wall of the channel. By this structure, it will be seen that a hard wearing face is provided between each of the rings and the inner ends of the plates also serve to more tightly seal the space beyond the inner ends of the rings. It is understood that the rings 22 and 23 are split, as indicated at 30, and the plates 24 and 25 are likewise split, as indicated at 31 and 32, but the splits in the plates are removed from the split 30 in the ring 24.

By the construction shown and described, it will be seen that the leakage of oil and compression on the head of the piston will have to take a very long and circuitous passage around the rear end of the numerous rings before it can pass into the crank case.

What is claimed is:

1. A piston having a wide channel in its periphery, outwardly extending spaced rectangular projections carried by the bottom wall of the channel, a series of rings of different depths arranged in the channel with their outer faces in the same plane, and every alternate ring having a removable tempered wearing plate secured to each side.

2. A piston having a wide channel therein, outwardly extending spaced rectangular projections circumferentially carried by the bottom wall of the channel, a ring within the channel formed by the projections and of a thickness less than the width of the channel, intermediate rings of the same width as the projections, and removable plates carried by the intermediate rings on each face thereof and extending inwardly beyond the projections.

3. A piston having a wide channel therein, spaced circumferential cross sectionally rectangular projections extending outwardly from the bottom wall of the channel, rings within the channel and arranged in intercurrent relation with said projections, intermediate rings of the same width as the projections and arranged in intervening relation with the first said rings, and split plates secured by screws one on each of the opposite faces of the intermediate rings, said plates being co-extensive with the first said rings with their splits offset from the splits with which the rings are formed.

STANLEY M. PELC.